Aug. 16, 1932.  B. L. BOBROFF  1,872,395
SWITCH CONSTRUCTION FOR SIGNALING SYSTEMS
Filed Nov. 6, 1929   2 Sheets-Sheet 1
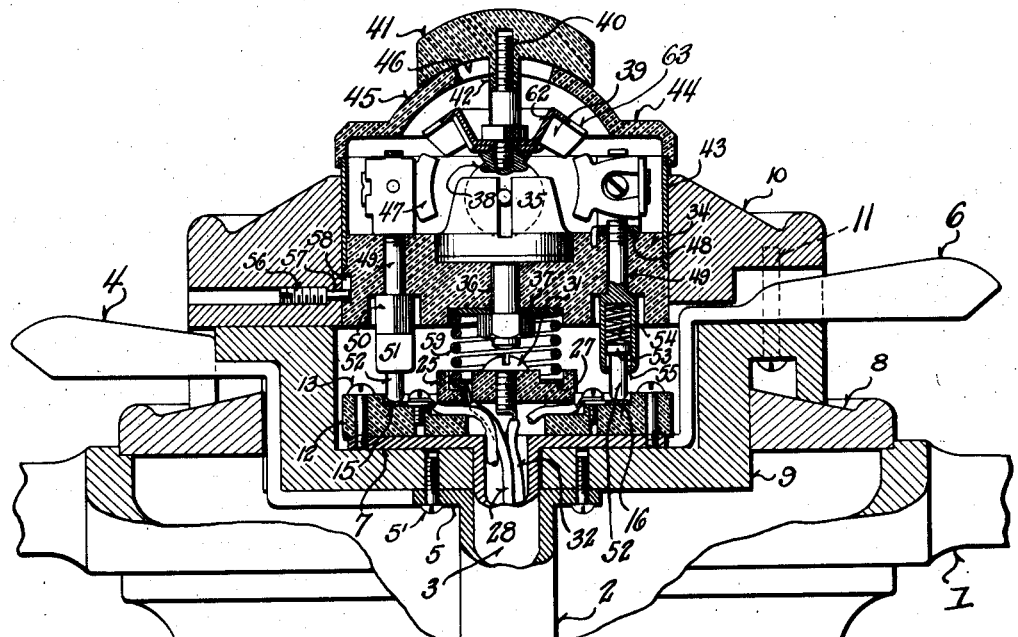
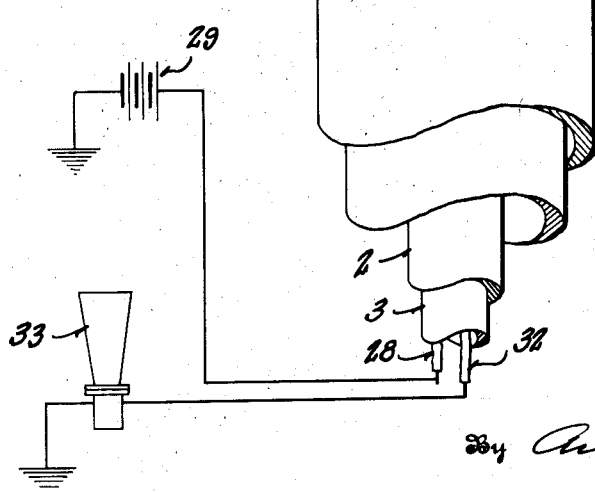
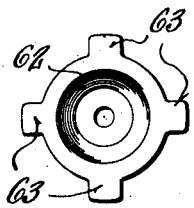
Fig.1
Fig.7
Inventor
Barnett L. Bobroff
By Arthur R. Woolfolk
Attorney Aug. 16, 1932. B. L. BOBROFF 1,872,395
SWITCH CONSTRUCTION FOR SIGNALING SYSTEMS
Filed Nov. 6, 1929  2 Sheets-Sheet 2
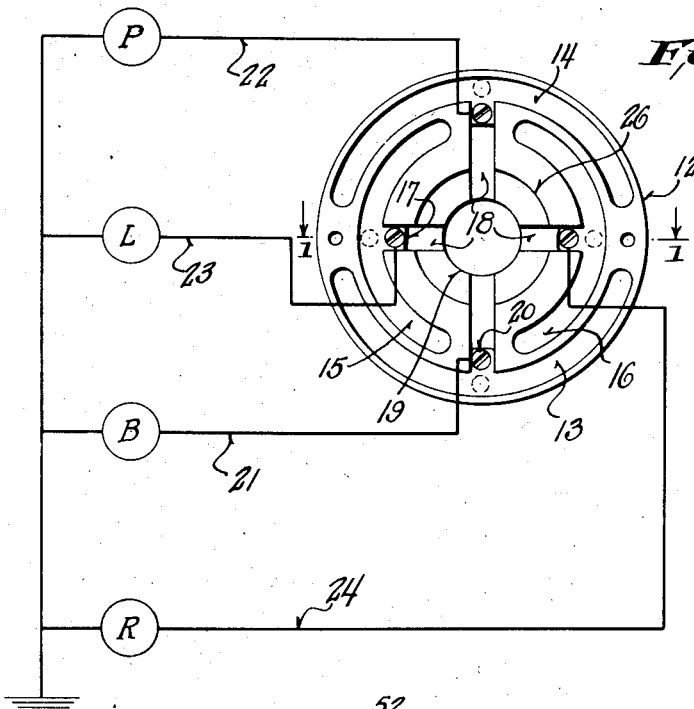
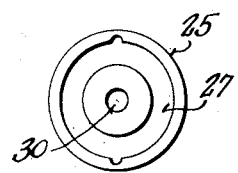
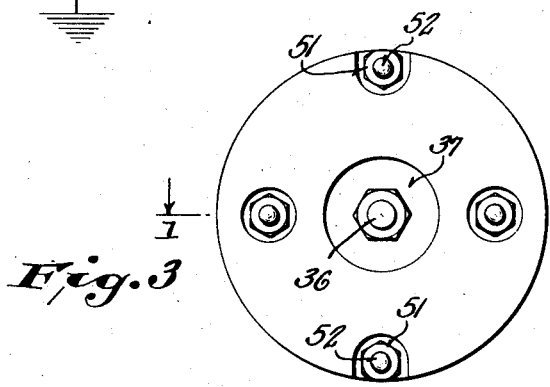
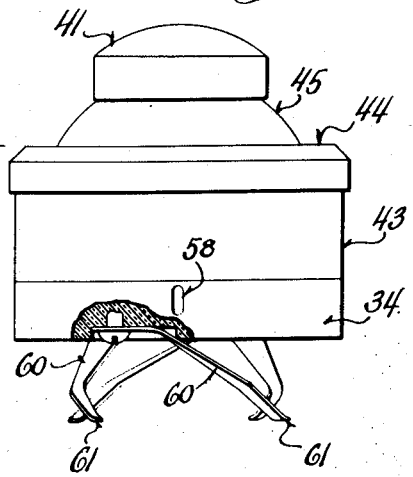
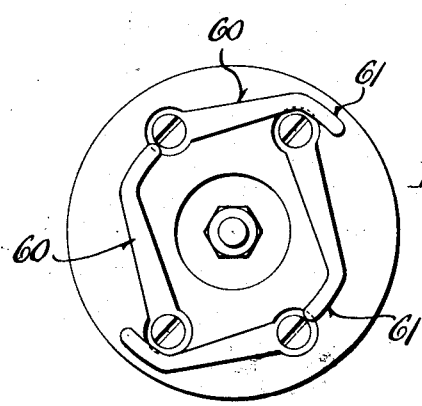
Inventor
Bornett L. Bobroff
By Arthur R. Woolfolk
Attorney Patented Aug. 16, 1932

1,872,395

UNITED STATES PATENT OFFICE

BORNETT L. BOBROFF, OF RACINE, WISCONSIN

SWITCH CONSTRUCTION FOR SIGNALING SYSTEMS

Application filed November 6, 1929. Serial No. 405,105.

This invention relates to switch constructions and is particularly directed to signal switch constructions for automotive signaling systems such, for instance, as shown in my copending application for signaling systems for automotive vehicles, Serial No. 377,821 filed July 12, 1929.

In general, this invention is an improvement over that disclosed in my copending application for switches for signaling systems, Serial No. 382,322 filed July 31, 1929.

Objects of this invention are to provide a novel form of switch which is particularly adapted for use on automotive vehicles and which is so constructed that it will readily control a plurality of signals in a simple and effective manner, and which is so made that it may be readily mounted upon the steering column of an automotive vehicle.

Further objects are to provide a signal switch for automotive vehicles which is so made that a universally mounted member may be moved in any desired direction to indicate, through the agency of appropriate signaling means, the intention of the driver of the vehicle, and which also is so constructed that the operation of the horn or other warning device is also controlled.

In my above noted copending application, Serial No. 882,322, and as disclosed in this application, it will be noted that a plurality of wires are electrically connected to the contact members of the switch and lead outwardly to the several signaling devices and also to the horn and to the supply means for the electrical energy, such, for instance, as the battery. The manner of attaching these wires so that they communicate electrically with the several contacts of the signaling switch is a difficult problem when it is considered that a very small space is available and when it is further considered that these connections must be substantially foolproof and permanent. It is difficult, for instance, to make these connections directly between the wires and the contact members of the switch and thereafter put the switch into place, as the looping or folding of the wires frequently causes considerable difficulty.

This invention is designed to overcome the difficulties discussed immediately above and objects of this invention are to provide a novel construction whereby a contact carrying member is carried by a suitable portion of the steering mechanism and is connected to the several wires leading to the signal device and to the supply means and in which a bodily removable switch unit is detachably held in its correct relative position and is permitted slight bodily motion to control one pair of contact members, the construction being such that the switch may be removed as a unit without disturbing any connection of the wires leading to the signal devices and the supply means.

In greater detail, objects of this invention are to provide a construction such that the conventional switch control rod supports the contact carrying member and in which the gas control tubular rod is provided with means for guiding and detachably holding the switch unit in place with respect to the contact carrying member, whereby a conventional type of steering post provided with a switch control rod and a gas control rod may be employed without in any way disturbing the normal function or structure of the members of the conventional steering post.

Further objects are to provide a switch construction for automotive vehicles in which a contact carrying member is supported by an appropriate portion of the steering column and a switch unit is detachably held by the steering column in a position adjacent the contact carrying member and is bodily movable as a unit therefrom, and in which the switch unit is provided with yielding or movable terminal members connected to the contact members of the switch and slidably and yieldingly engaging the contacts of the contact carrying member, the contacts of the contact carrying member being arcuate so that the contact carrying member may be mounted upon the light control rod and the switch unit may be carried from the gas control tubular rod, the arcuate contact members being always in engagement with the movable and yieldingly urged terminal members of the switch unit irrespective of the relative adjustment of the gas control lever with respect to the light switch control lever of the standard steering column.

Further objects are to provide a novel form of contact member which is so constructed that it has a double function of holding a switch contact in place and of providing a yielding contact member electrically connected to the contact of the switch and adapted to engage another contact member outside of the switch.

Embodiments of the invention are shown in the accompanying drawings, in which:

Figure 1 is a sectional view through the upper end of the steering post and through the switch, such view corresponding to a section on the lines 1—1 of Figures 2 and 3.

Figure 2 is a plan view of the contact carrying member with which the switch unit cooperates.

Figure 3 is a bottom view of the switch unit.

Figure 4 is a detail of one of the elements of the contact carrying member.

Figure 5 is a side elevation of a modified form of switch unit.

Figure 6 is a bottom view of the structure shown in Figure 5.

Figure 7 is a plan view of the cup element of the switch.

Referring to the drawings, particularly Figure 1, it will be seen that a steering post for an automotive vehicle has been shown as provided with a hand wheel 1, a gas control tubular rod 2 and a light switch tubular rod 3. The fuel control lever 4 is rigidly connected to a plate 5 carried by the fuel control rod 2 and the light switch lever 6 is rigidly connected to a plate 7 carried by the light switch tubular rod. It is the usual practice to provide a washer or top ring 8 for the steering wheel.

Within this top washer an intermediate member or housing 9 is positioned and is rigidly attached as by means of screws 5' to the plate 5 of the fuel control rod. Upon this intermediate member or housing member 9 a finishing ring or washer 10 is positioned and is rigidly secured to the member 9 by means of screws 11 or in any other suitable manner. The members 9 and 10 form a housing for a contact carrying member and for a switch unit as will hereinafter appear.

It is preferable to form the intermediate member 9 and the finishing washer or ring 10 of insulating material although this construction is not absolutely essential as other materials could be used. However, if these members are formed of the same general type of material as that of the steering wheel a very pleasing result is produced.

The contact carrying member 12 is rigidly secured by means of screws 13 to the plate 7, as shown most clearly in Figure 1. This contact carrying member 12 is shown in detail in Figure 2 and it will be seen from a comparison of such figures that the contact carrying member is provided with a plurality of arcuate contact strips or members 13, 14, 15 and 16. These members are preferably curved strips of metal and each is provided with an inwardly projecting tongue as shown in Figure 2, the tongues generally being indicated by reference character 17. The arcuate members 13 to 16 inclusive are seated within arcuate slots formed within the contact carrying member 12, such contact carrying member being, of course, of insulating material. The tongues 17 are seated within radial slots 18, as shown very clearly in Figure 2, formed in the contact carrying member 12. The radial slots 18 open into the central aperture 19 which extends completely through the contact carrying member.

Each of the tongues 17 is provided with a wire receiving or conductor receiving screw 20. This screw may also serve to hold the arcuate contacts in place although, obviously, they may be held in any suitable manner.

The contacts 13, 14, 15 and 16 are respectively connected by means of conductors 21, 22, 23 and 24 to the desired signal lamps indicated respectively at B, P, L and R, such lights having their other sides or contacts grounded as indicated in Figure 2. The conductors 21 to 24 inclusive may lead upwardly through the tubular light switch rod 3, as indicated in Figure 1, and extend to the appropriate contacts 13 to 16 inclusive, such conductors lying within the corresponding slots 18.

The contact carrying member 12 is also provided with an auxiliary contact carrying portion 25 formed of insulating material as shown in Figure 4. The member 25 is circular in contour and fits within a circular recess 26 in contact carrying member 12. In Figure 2 the member 25 has been omitted for the sake of clearness. Its correct relative position is, however, very clearly shown in Figure 1. This auxiliary member 25 is provided with a circular recess within which is seated a circular contact ring 27, (see Figures 1 and 4). This contact ring may be provided with nibs or ears to prevent its rotation. Contact ring 27 is connected to the main supply conductor 28 which leads to the live side of the battery 29 or other source of electrical energy. The battery has the other side grounded as indicated in Figure 1.

The auxiliary member 25 is provided with a centrally located aperture 30 which receives the central contact screw 31 (see Fig. 1). This center contact screw is connected by means of the conductor 32 to one side of the horn 33, the other side of the horn being grounded as indicated in Figure 1.

From the description thus far given it is apparent that the contact ring 27 is connected to the main source of energy supply and that a central horn contact is provided, and in addition, a plurality of arcuate contacts are provided and connected to their respective signal lamps or other signal means.

It is to be seen that all of the connections may be most easily made, as shown in Figure 1, and that no wires need be attached to the switch unit which will hereinafter be described, but such switch unit instead is a separate distinct entity and is bodily removable from the rest of the apparatus.

The switch unit consists of a body portion 34 formed of insulating material and carrying a central member 35 which is a hollow shell provided with a stem 36, screw threaded and locked by means of a nut, to a contact plate 37, as shown in Figure 1. This member 35 receives a supporting ball 38 of the movable switch member 39 and such ball is provided with a plurality of pins which fit within guiding slots formed in the member 35 as developed in detail in my above copending application, Serial No. 382,322. The movable portion of the switch is provided with an upper cup-shaped member 62 which is provided with fingers 63 positioned above the corresponding blades of the movable member 39 of the switch. The movable switch member is provided with an outwardly projecting operating portion 40 which may consist of a shouldered screw threaded shank. A manipulating button or knob 41 is provided with a threaded aperture adapted to receive the shank 40. Preferably, the knob 40 is provided with an integral inwardly projecting sleeve 42 which seats against the shoulder of the shank 40, as shown in Figure 1. The operating portion 40 is threaded into the ball 38 and clamps the movable member 39 and the cup-shaped member in place.

The body portion carries the sleeve 43 which has a cylindrical contour. The top of the casing is indicated at 44 and has an approximately spherical central portion 45 which is provided with a plurality of slots 46. The construction of the switch is similar to that set forth in my above noted copending application No. 382,322.

The movable portion of the switch is selectively adapted to engage any one of a plurality of stationary contacts 47 so as to control any one of the several signaling lights previously mentioned. Each of the stationary contacts 47 is provided with a base portion 48. The base portions are each provided with a threaded aperture which receives the threaded shank 49 of a contact member. This contact member is provided with a polygonal head 50, (see Fig. 1) which is hollow and which has a projecting sleeve 51, as shown in the section on the right hand side of Figure 1. Preferably, the shank 49, the head 50 and the sleeve 51 are formed integrally, as indicated. A plunger 52 is slidably carried within the sleeve 51 of the head 50 and is provided with an enlarged rear end or head 53. A small compression spring 54 is positioned within the hollow head and bears against the enlargement 53. The projecting plunger 52 is thus spring-pressed outwardly from the head 50 and this plunger is provided with a rounded end, as shown in Figure 1. After the spring and plunger have been assembled within the head 50 of the contact member, the end of the sleeve 51 is spun over, as indicated at 55 so as to permit a free passage therethrough to the plunger 52 and to prevent the passage of the head 53 of the plunger. This construction, therefore, provides a very simple contact member which has a double function of holding a stationary switch contact member in place, also of providing a spring-pressed contact-making plunger. The plungers 52, as shown in Figure 1 and as indicated in dotted lines in Figure 2, are adapted to engage the arcuate contact strips 13 to 16 inclusive, one strap being provided for each plunger.

The entire switch unit is bodily removable as a unit from the rest of the mechanism but is restrained from removal under normal conditions by means of screws which are provided with projecting terminals of pins fitting within the elongated slots in the switch unit. One of the screws is shown in Figure 1 and indicated by the reference character 56, the projecting end or pin thereof being indicated at 57. This pin fits within an elongated slot 58 and thus permits limited bodily motion of the switch unit so that the switch unit may be moved downwardly or upwardly throughout a limited range.

Normally, the switch unit is held in its uppermost position by means of a compression spring 59 positioned between the contact ring 27 and the contact plate 37. This compression spring, therefore, holds the shank 36 (see Fig. 1) out of contact with the screw 31 and thus prevents closing of the horn circuit unless the switch unit is bodily depressed. This switch unit forms in effect a horn button. Thus, a horn button is provided which is hollow and which itself carries a complete signal switch mechanism.

In addition to the function of the spring discussed above, it is to be noted that the spring forms a portion of the main supply circuit leading from the live side of the battery 29 and thus conducts current to the movable portion 39 of the signal switch. Whenever the signal switch is swung into a position to cause the movable member 39, the movable portion thereof, to engage a stationary contact, current flows from the battery 29 through the conductor 28 to the plate 27. From this point current flows through the spring 59 to the central portion of the movable portion of the signaling switch. Thus the signaling switch is supplied through the medium of the horn button spring.

It is to be noted that a very compact construction is obtained by means of this invention and one in which the switch itself is bodily movable downwardly to close the horn circuit and also in which the signal switch may be manipulated to give any desired signal. Obviously, the construction permits either the independent giving of a signal or the simultaneous signaling and blowing of the horn, depending upon the choice of the operator.

It is to be noted particularly that this switch does not require that any of the several conductors be brought into the body of the switch unit, instead each of the several conductors is readily attached to the appropriate contact of the contact carrying member 12. Thereafter, the switch as a wholly distinct unit is slipped into place and held in its correct position by means of the screws 56.

This construction enables the assembler to connect all of the wires to the contacts of the contact carrying member with the utmost facility. None of the wires need be looped back into place, which would have been the result had the wires been attached to the switch unit and the switch unit thereafter positioned. As a matter of fact the contruction permits the ready removal of the switch unit in the event that it needs repair and inspection and permits the ready positioning of a new switch when needed without in any way disturbing the wire.

Another point to be noted particularly is that relative rotary motion is permitted between the switch unit and the contact carrying member, for, under these conditions the spring-pressed plungers 52 slide along the arcuate contact members 13 to 16 inclusive. It is, therefore, possible to carry the several parts of this apparatus in the manner previously described. For instance, the contact carrying member 12 is rigidly carried by the plate 7 of the light switch rod 3 and the switch unit is independently supported from the plate 5 of the gas control rod 2. Although the rods 2 and 3 may be independently rotated through a limited range by means of the gas lever 4 and the light switch lever 6 respectively, nevertheless, no harm is done as the spring-pressed plungers ride freely upon their corresponding arcuate contact strips.

It is, of course, to be understood that the invention may take other forms from that specifically set forth. One of the many other forms that the switch unit may take is shown in Figure 5. In this form of the invention the spring-pressed contact plungers are replaced by curved spring fingers 60 whose free ends 61 correspond in position to the spring-pressed plungers. These free ends 61 are adapted to engage the appropriate arcuate contact strips 13 to 16 inclusive, otherwise, the construction of the switch is identically the same as that previously described.

It is apparent that due to the fact that the arcuate contact strips 13 to 16 inclusive are set down within similarly shaped recesses in the contact carrying member 12, that a small web or guide is provided which aids in holding the contact portions 61 of the fingers 60 in position against radial displacement and, also in the first form of the invention aid in holding the spring-pressed plungers 52 against radial displacement with respect to the contact carrying member 12, even if through wear a defective or loose fit should result between the spring-pressed plungers and their contact members 50 but, nevertheless, the setting of the arcuate contact members 13 to 16 inclusively downwardly with recesses would prevent displacement of these spring-pressed plungers.

In using either form of the apparatus it is apparent that when it is desired to blow the horn, all that is necessary is to bodily depress the switch unit. If it is desired to signal the direction of turn, for instance, left or right, the button 41 is swung in the corresponding direction. Also, if it is desired to indicate parking or backing the button 41 is swung forwardly or rearwardly as described in greater detail in my above noted copending application 382,322.

It will be seen that a combined horn button and switch unit has been provided by this invention which is bodily removable without disturbing any of the connections and which is so made that it will cooperate with the contact carrying member and maintain the integrity of the several circuits irrespective of relative rotary motion of the switch unit and the contact carrying member.

Further advantages result from the construction described in detail above. For instance, the fingers 63 of the cup-shaped member 62 act as stops to limit the swinging or rocking of the switch as such fingers strike the corresponding stationary contacts towards which the switch is rocked, and in addition make electrical contact with such stationary contacts. When the switch is rocked to neutral or open position, the finger 63 first breaks connection with the corresponding stationary contact 47 and an instant later the movable blade 39 or movable member breaks connection with the stationary contact 47. Therefore, if the blades of the movable member should become corroded, the fingers will still make good electrical contact with the appropriate stationary contact. Further, if any small amount of water should leak into the casing, the cup will catch the water and hold it temporarily until the water evaporates, and thus no water will get to the switch contacts.

I claim:

1. A signal switch for automotive vehicles comprising supporting means, a contact carrying member carried by said supporting means and having a plurality of contacts, conductors connected to said contacts, and a complete switch unit carried by said supporting member and having a plurality of terminal members, the contacts and terminal members being yieldingly held together.

2. A switch for automotive vehicles comprising supporting means, a contact carrying member carried by said supporting means and having a plurality of contacts, conductors connected to said contacts, and a complete switch unit having a plurality of yielding terminal members yieldingly bearing against said contacts.

3. A switch for automotive vehicles comprising supporting means, a contact carrying member carried by said supporting means and having a plurality of contacts, conductors connected to said contacts, and a bodily removable complete switch unit having a plurality of yielding terminal members yieldingly bearing against said contacts.

4. A signaling switch comprising supporting means, a contact carrying member carried by said supporting means and having a plurality of contacts, a complete switch unit having a plurality of terminal members, and means detachably locking said switch unit with respect to said supporting means with said terminal members in engagement with said contacts.

5. A signaling switch comprising supporting means, a contact carrying member carried by said supporting means and having a plurality of contacts one of which is arranged approximately centrally, a switch unit having a plurality of terminal members adapted to engage said contacts and having an approximately centrally arranged contact, and means detachably locking said switch unit and with reference to said supporting means, said switch unit having limited bodily movement with respect to said contact carrying member, whereby said centrally arranged contacts will engage each other when said switch unit is bodily moved towards said contact carrying member.

6. A signaling switch comprising supporting means, a contact carrying member having a plurality of arcuate contacts, a switch unit having a plurality of switch contacts and having a plurality of terminal members connected to said switch contacts and engaging the arcuate contacts of said contact carrying member, said contact carrying member and said switch unit having relatively rotary motion, said terminal members remaining in contact with said arcuate contacts, when said switch unit and said contact carrying unit are given relative rotary motion.

7. A signaling switch comprising supporting means, a contact carrying member having a plurality of arcuate contacts, a switch unit having a plurality of switch contacts and having a plurality of terminal members connected to said switch contacts and engaging the arcuate contacts of said contact carrying member, said contact carrying member and said switch unit having relatively rotary motion, said terminal members remaining in contact with said arcuate contacts when said switch unit and said contact carrying unit are given relative rotary motion, said switch unit being bodily movable towards and from said contact carrying member and said switch unit and contact carrying member having contacts adapted to engage each other when said switch member is bodily moved towards said contact carrying member.

8. In an automotive vehicle, the combination of a light switch rod, a tubular gas control rod surrounding said light switch rod, a contact carrying member having contacts, said contact carrying member being supported from said light switch rod, and a switch unit having a plurality of contacts and having terminal members electrically connected thereto and engaging the contacts of said contact carrying member, and means detachably holding and supporting said switch unit from said gas control rod, whereby said gas control rod and said light switch rod may be independently rotated without interrupting the connection between said terminal members and the contacts of said contact carrying member.

9. A horn button for an automotive vehicle comprising a support, a contact carried by said support, a switch unit bodily movable with respect to said support and having a contact adapted to engage said first mentioned contact, said switch unit having switch contacts and having terminal members connected to said switch contacts, and other contacts carried by said support and slidably engaging said terminal members, whereby said switch member may be removed without disturbing said last mentioned contacts.

10. A signaling switch comprising a contact carrying member having arcuate recesses and arcuate contacts mounted within said recesses, a bodily removable switch unit having a plurality of contacts and having terminal members electrically connected to the contacts of said switch unit, said terminal members being yieldingly urged outwardly from said switch unit and normally slidably contacting with said arcuate contacts, and means for detachably holding said switch unit in place.

11. A horn button for the steering column of an automotive vehicle, said horn button having a contact and having a body portion provided with a contact adapted to engage said first mentioned contact, said body portion being hollow and having signal switch mechanism therein, a movable member located on the outer side of said body portion for actuating said switch mechanism, and conductors connected to said switch mechanism, said horn button being bodily removable without disturbing said conductors.

12. A horn button for the steering column of an automotive vehicle, said horn button having a lower contact and having a hollow body portion movably carried with respect to said lower contact, said body portion having a horn circuit contact adapted to engage said first mentioned contact when said body portion is depressed, switch mechanism located within said hollow body portion and comprising a main contact member and a plurality of switch contacts adapted to be selectively engaged by said main contact member, said main contact member being electrically connected to said horn contact, a spring electrically connected to said main contact member, and detachable means normally electrically connected to said switch contacts.

13. A signaling switch structure comprising a member provided with a contact, a bodily movable body portion having a contact adapted to engage said first mentioned contact, a spring normally holding said contacts apart, switch mechanism carried by said body portion, said spring acting to convey current to said switch mechanism independently of the engagement of said contacts.

14. A composite horn button comprising a hollow body portion, switch mechanism carried within said hollow body portion, said body portion having a slot, switch operating means projecting through said slot, a thumb button carried by said switch operating means and covering said slot in all positions of said switch operating means, a support slidably carrying said composite horn button, a horn contact carried by said body portion, and a second horn contact normally spaced from said first mentioned horn contact and adapted to be engaged by said first horn contact when said switch is bodily moved.

15. A switch comprising a body portion having a plurality of stationary contact members, an operating member movably carried by said body portion and having contacts adapted to selectively engage the stationary contact members when said operating member is rocked, and a cup-shaped member carried by said operating member and located above the contacts of said operating member, said cup-shaped member having its open end directed upwardly.

16. A switch comprising a body portion having a plurality of stationary contact members, an operating member movably carried by said body portion and adapted to be rocked towards any stationary contact, said operating member having a plurality of blades, and a member carried by said operating member and having fingers located adjacent each blade and adapted to engage the edges of said stationary contacts when said operating member is rocked, whereby, when the operating member is rocked, the appropriate blade and finger will engage the corresponding stationary contact, the blade engaging the stationary contact prior to the engagement of the finger with the stationary contact.

In testimony whereof, the signature of the inventor is affixed hereto.

BORNETT L. BOBROFF.